(12) United States Patent
Kinder

(10) Patent No.: US 9,047,163 B2
(45) Date of Patent: Jun. 2, 2015

(54) MANAGING THE DISTRIBUTION OF CLIENT PACKAGES

(75) Inventor: Nathan G. Kinder, Castro Valley, CA (US)

(73) Assignee: Red Hat, Inc., Raleigh, NC (US)

( * ) Notice: Subject to any disclaimer, the term of this patent is extended or adjusted under 35 U.S.C. 154(b) by 1809 days.

(21) Appl. No.: 12/191,972

(22) Filed: Aug. 14, 2008

(65) Prior Publication Data

US 2010/0042990 A1    Feb. 18, 2010

(51) Int. Cl.
*G06F 21/00*  (2013.01)
*G06F 9/44*  (2006.01)

(52) U.S. Cl.
CPC .......................................... *G06F 8/68* (2013.01)

(58) Field of Classification Search
USPC ............ 705/51, 16, 21, 59; 380/44, 262, 278, 380/279
See application file for complete search history.

(56) References Cited

U.S. PATENT DOCUMENTS

| | | | |
|---|---|---|---|
| 7,203,738 B1* | 4/2007 | McGill et al. | 709/219 |
| 2002/0048369 A1* | 4/2002 | Ginter et al. | 380/277 |
| 2005/0251448 A1* | 11/2005 | Gropper | 705/14 |
| 2008/0005733 A1* | 1/2008 | Ramachandran et al. | 717/168 |

* cited by examiner

*Primary Examiner* — Dante Ravetti
(74) *Attorney, Agent, or Firm* — Lowenstein Sandler LLP

(57) ABSTRACT

A method and system of a distributing server that encapsulates a client package within a client software repository package. The client software repository package contains at least a portion of a client repository. The client repository is installed at the subscribing server and is associated with one or more clients that are not authorized to access the distributing server. The distributing server transmits the client software repository package to a subscribing server that is authorized to access the distributing server. The subscribing server then serves the client package to the clients through the client repository.

21 Claims, 5 Drawing Sheets

MANAGING THE DISTRIBUTION OF CLIENT PACKAGES

TECHNICAL FIELD

Embodiments of the present invention relate to software distribution, and more specifically, to distribution of client packages to clients that do not have access to a software distributor.

BACKGROUND

Software packages (or "packages") are distributions of software and metadata. A package management system includes a collection of tools to automate the process of installing, upgrading, configuring, and removing software packages from a computer. A package management system on Unix and Unix-like (e.g., Linux) systems typically manage thousands of packages.

Software packages are often distributed from a software distributor to a customer's site that includes servers and clients connecting to the servers. The software distributor may set up a plurality of distribution channels, with each distribution channel offering one software product to the servers and the clients. A customer subscribing to one channel is permitted to download and update the corresponding software product from that channel.

Conventional software distributors distribute server packages to a customer's servers through a channel, using a package management system to manage the installation, updates and removal of software. To distribute client packages to the customer's client machines, the customer's servers need to download the client packages locally, and an administrator will need to manually configure each client machine to install/update the software from the servers. As software updates may occur frequently, manual configuration is time-consuming and inefficient. Alternatively, a software distributor needs to set up a client distribution channel for the client machines to directly download the client packages from the distributor. Generally, direct communication through a distribution channel is supported when the participants are on the same operating system platform. However, the distributor's server and the client machines may not use the same operating system, and, therefore, may not be able to transfer packages through the distribution channel. Further, direct communication between a distributor and client machines may have negative security implications. Thus, there is a need to improve the distribution of client software to client machines.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
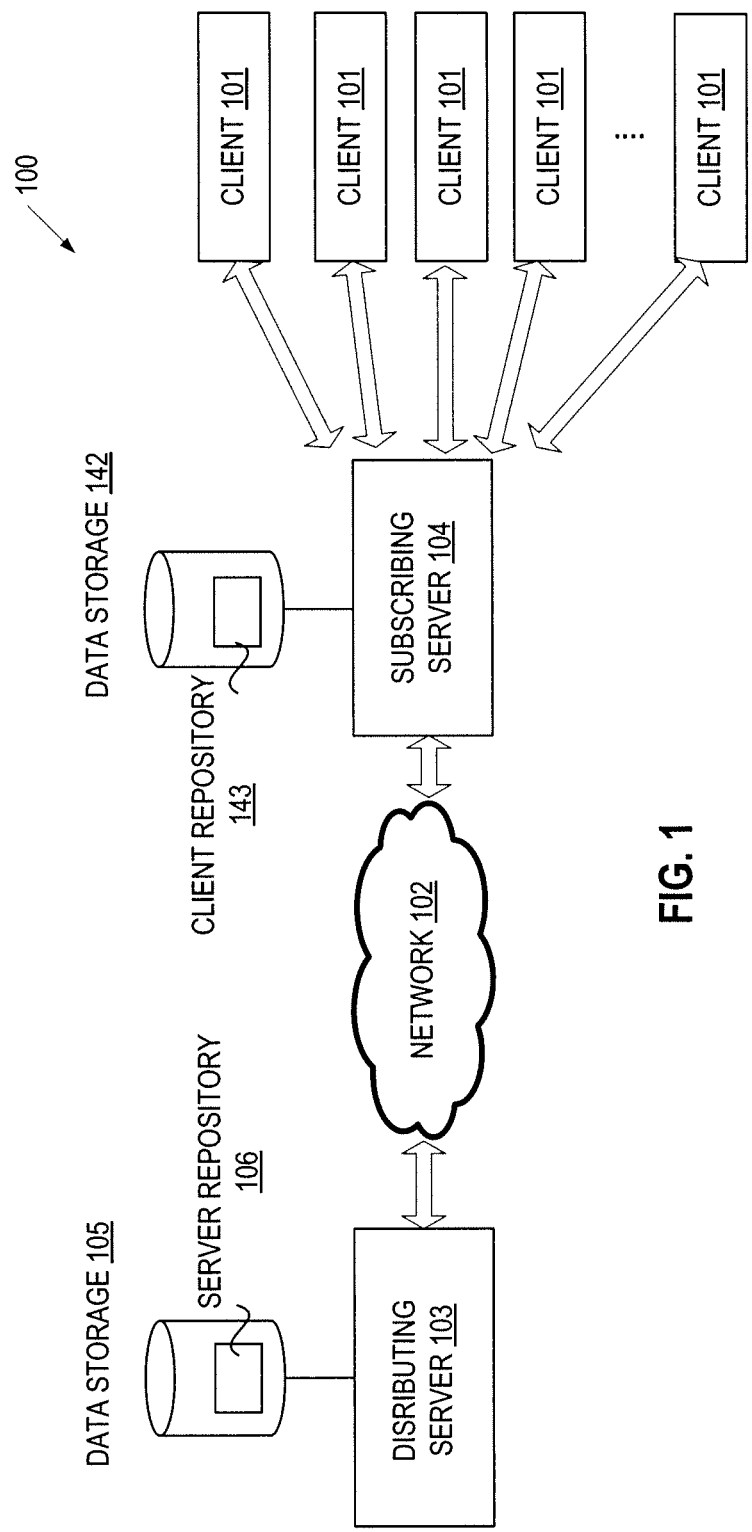
FIG. 1 illustrates a network architecture in which embodiments of the present invention may be implemented.

A method and system for distribution of client packages from a distributing server to clients are described. In one embodiment, the distributing server encapsulates a client package within a client software repository (repo) package. The client software repo package contains at least a portion of a client repository, which is associated with one or more clients that are not authorized to access the distributing server. The distributing server transmits the client software repo package to a subscribing server that is authorized to access the distributing server. The subscribing server installs the client software repo package locally and extracts the client package and other information from the client software repo package. The extracted client package and information are stored in the client repository located on the subscribing server. The subscribing server then serves the extracted client package to the clients through the client repository.

In some scenarios, the clients and the distributing server may run different operating systems. For example, the distributing server may run a Linux operating system and the clients may run a Solaris operating system. Thus, client packages can have a format that is compatible with an operating system of the clients, but is incompatible with a native package format used by the distributing server. A client software repo package, on the other hand, has a native package format that is commonly used by both the distributing server and the subscribing server. By encapsulating the client package within a client software repo package and transmitting the client software repo package to the subscribing server, the subscribing server can establish a client repository locally and distribute the client packages through an existing network (e.g., a company's private network to the clients.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "encapsulating", "transmitting", "receiving", "indicating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary system 100 in which embodiments of the present invention may operate. The system 100 includes a distributing server 103 and a subscribing server 104 coupled by a network 102, which may be a public network (e.g., Internet) or a private network (e.g., Ethernet or a Local Area Network (LAN)). In one embodiment, the distributing server 103 is managed by a software distributor who distributes software releases and updates, as packages, to the subscribing server 104 at a customer's site. More than one subscribing servers 104 may be coupled to the distributing server 103 to receive the packages. The subscribing server 104 is also coupled to a plurality of clients 101. The clients 101 may be a computing device such as, for example, a desktop computer, laptop computer, server, cellular phone, personal digital assistant (PDA), etc. The clients 101 are registered with the subscribing server 104 and do not have access to the distributing server 103.

As an example, the clients 101 are computers and workstations of an organization and the subscribing server 104 is an email server of the organization. The subscribing server 104 subscribes to mail application software from the distributing server 103, and receives packages from the distributing server 103 to enable the installation and updates of the mail application software on the machines in the organization. The packages may be sent and received automatically via a pre-established distribution channel between the distributing server 103 and the subscribing server 104. One example of the distribution channel implements a mechanism defined by the Yellow Dog Updater, Modified (Yum) utility, which is developed for some versions of the Linux operating systems.

In one scenario, the software distributed by the distributing server 103 may include server packages to be installed on the subscribing server 104 for performing server-side functions, as well as client packages to be installed on the clients 101 for performing client-side functions. These server packages and client packages are associated with a software product to which the subscribing server 104 subscribes.

Conventionally, for the clients 101 to receive the client packages, a system administrator of a subscribing organization may configure each one of the clients 101 to point to a software distributor's location where the client packages are stored. However, a software product may have frequent updates available that are saved at different locations. For an organization with hundreds or more client machines, it is time consuming to re-configure all of its client machines every time a new update is available. Establishing an automatic mechanism for distributing the client packages directly to the clients 101 may compromise data security and may dramatically increase the complexity of software distribution. Additionally, a subscribing organization may wish to have direct control over the client machines that can receive the updates, and may not wish all of its client machines to have direct access to the distribution site.

According to one embodiment of the present invention, the distributing server 103 is coupled to data storage 105, in which one or more server repositories 106 are located (only one is shown). The server repository 106 may store server packages for the installation and updates to software on a server (e.g., the subscribing server 104). The term "updates" herein refers to the code that modifies or removes the existing client software. Each server repository 106 may include the packages associated with a software product. Although only one distributing server 103 is shown, it is understood that a software distributor may have a plurality of distributing servers 103, each managing a subset of its customers and/or a subset of its software products. In alternative embodiments, the server repositories 106 may be stored in the main memory or other local storage devices of the distributing server 103.

In one embodiment, the subscribing server 104 is locally coupled to data storage 142, in which one or more client repositories 143 are located (only one is shown). In alternative embodiments, the client repositories 143 may be stored in the main memory or other local storage devices of the subscribing server 104. Each client repository 143 may include the client packages associated with one or more software products that are to be installed on the clients 101. The clients 101 can download the client packages (e.g., client-side mail application software) from the client repository 143, using a communication mechanism that has been pre-established by the organization. As the clients 101 download the client packages from the subscribing server 104, the subscribing server 104 can maintain control over the accessibility of the client packages, e.g., which clients 101 and/or how many clients 101 can download the client packages. Further, as the client packages are transported between the subscribing server 104 and the clients 101 within an organization's existing network, the transport can occur between machines that run on different operating systems. For example, the subscribing server 104 may run a Linux operating system and the clients 101 may run a Solaris operating system.

Figure 2:
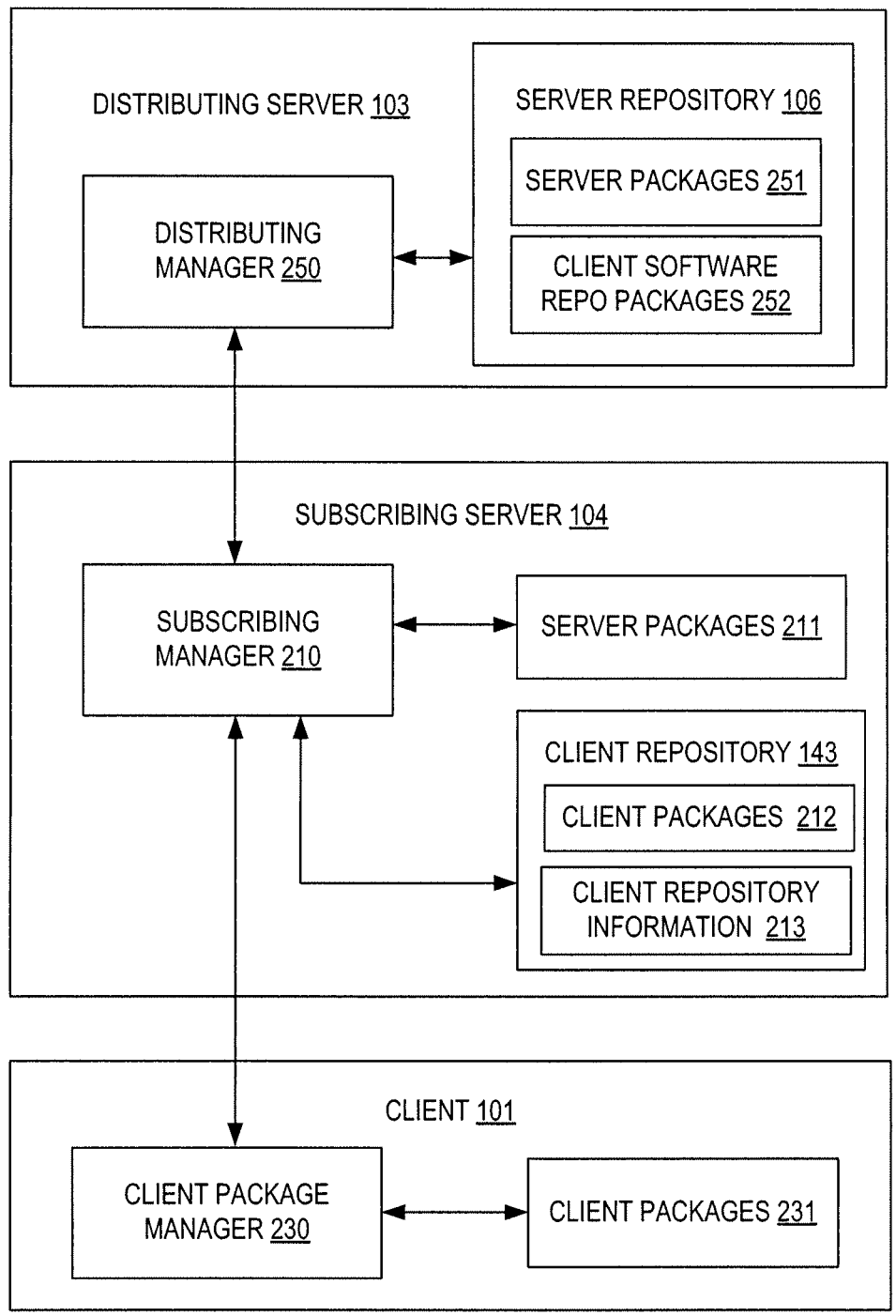
FIG. 2 is a block diagram illustrating one embodiment of a distributing server, a subscribing server and a client.

FIG. 2 illustrates components of the distributing server 103, the subscribing server 104 and the client 101 according to one embodiment of the present invention. In the embodiment, the distributing server 103 includes a distributing manager 250 that responds to the queries from the subscribing server 104 for new or updated packages in the server repository 106. The distributing manager 250 also manages the storage and retrieval of the packages in the server repository 106. The server repository 106 stores server packages 251 and client software repo packages 252. The server packages 251 are to be installed on the subscribing server 104 for performing server-side functions. The client software repo packages 252 are also to be installed on the subscribing server 104 for establishing the client repository 143 on the subscribing server 104. That is, the client software repo packages 252 contain at least a portion of the client repository 143 associated with the clients 101. Within the client software repo packages 252, the distributing manager 250 encapsulates one or more client packages 212 that are associated with one or more software products subscribed by the subscribing server 104. The distributing manager 250 also encapsulates client repository information 213 necessary for the communications between the subscribing server 104 and the clients 101. The client software repo packages 252 have a format that is compatible with the operating systems used by both the distributing server 103 and the subscribing server 104. The client packages, on the other hand, can have a format that is compatible with an operating system of the clients 101, but is incompatible with a native package format used by the distributing server 103.

The subscribing server 104 includes a subscribing manager 210 that manages the installation of server packages 251 and the client software repo packages 252 on the subscribing server 104. After the client software repo packages 252 are installed on the subscribing server 104, the subscribing manager 210 extracts the client packages 212 and client repository information 213 and store them in the client repository 143. The subscribing manager 210 also responds to the queries from the clients 101 for new or updated client packages in the client repository 143. The client 101 includes a client package manager 230, which manages the installation of client packages 231 on the clients 101. The client package manager 230 communicates with the subscribing manager 210 to download the new or updated client packages from the client repository 143.

Figure 3:
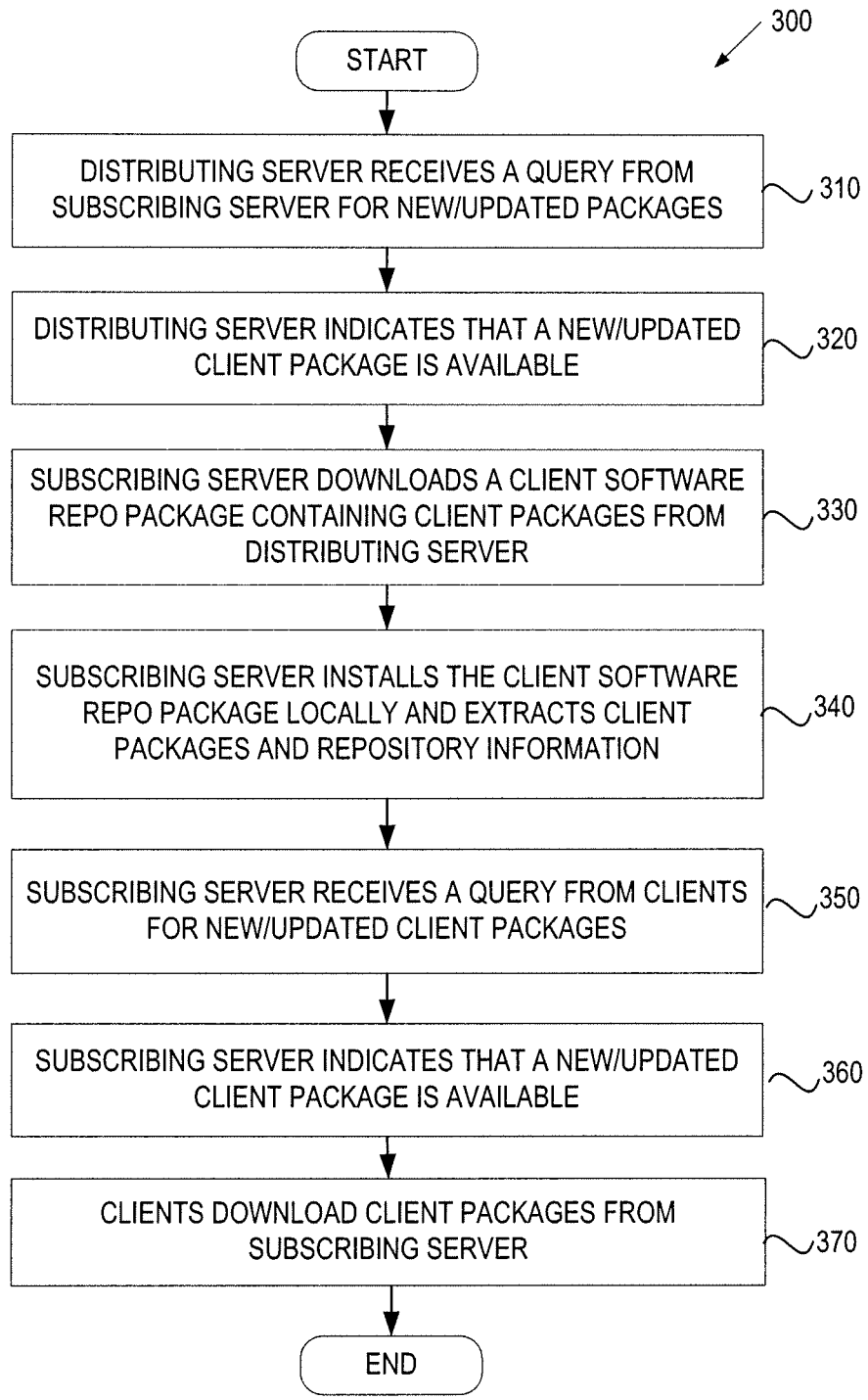
FIG. 3 is a flow diagram illustrating operations performed by the distributing server, the subscribing server and the client for distributing client packages to the client according to one embodiment of the present invention.

FIG. 3 is a flow diagram that illustrates a method 300 for distributing client packages to the clients 101, according to one embodiment of the present invention. The method 300 may be performed by the processing logic 526 of FIG. 5 that may comprise hardware (e.g., circuitry, dedicated logic, programmable logic, microcode, etc.), software (such as instructions run on a processing device), or a combination thereof. In one embodiment, the method 300 is performed by the distributing server 103, the subscribing server 104 and the client 101 of FIGS. 1 and 2.

Referring to FIG. 3, at block 310, the distributing server 103 receives a query from the subscribing server 104 regarding the existence of a new or updated package. After checking the server repository 106, the distributing server 103 indicates to the subscribing server 104 whether any new or updated package for the subscribing server 104 exists. If there is no new or updated package in the server repository 106, the distributing server 103 indicates to the subscribing server 104 to send a query at a later time. Otherwise, at block 320, the distributing server 103 indicates to the subscribing server 104 that there is a new or updated package. In one embodiment, the query and response use a standard data exchange format, such as the extensible markup language (XML). At block 330, the subscribing server 104 downloads the package from the server repository 106. The package download follows a protocol which has been pre-established between the distributing server 103 and the subscribing server 104. For example, the subscribing manager 210 (of the subscribing server 104) may inform the distributing manager 250 (of the distributing server 103) of the package versions that the subscribing server 104 currently has, and, based on that information, the distributing manager 250 determines which packages should be sent. If there is a new or updated server package, the subscribing server 104 downloads and installs it locally for performing server-side functions. If there is a new or updated client package, the subscribing server 104 downloads a client software repo package that encapsulates the new/updated client packages.

Continuing the scenario in which a new/updated client package is available, at block 340, the subscribing server 104 installs the client software repo package locally and extracts client packages and other repository information from the client software repo package. The extracted data and information is stored in the client repository 143 accessible to the clients 101.

Continuing to block 350, the subscribing server 104 receives a query from one or more clients 101 for new/updated client packages. At block 360, the subscribing server 104 indicates to the clients 101 that a new/updated client package is available. At block 370, the clients 101 download the new/updated client package from the client repository 143, using a protocol pre-established between the subscribing server 104 and the clients 101.

Figure 4:
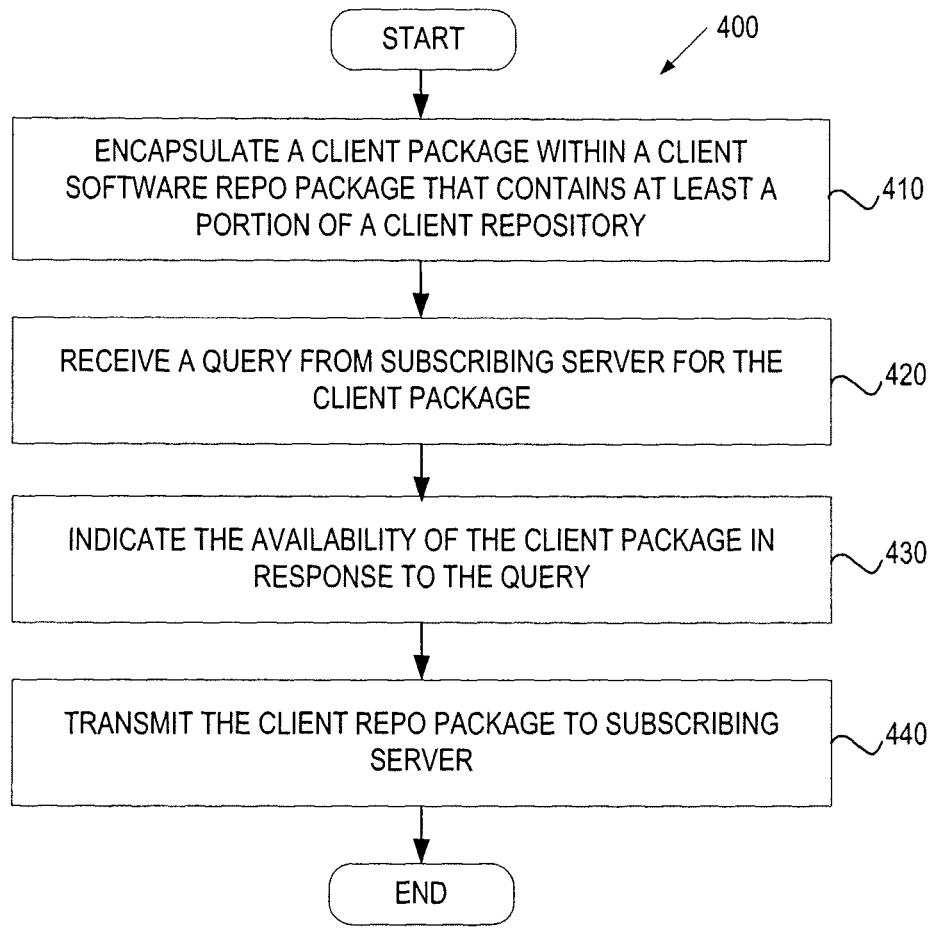
FIG. 4 is a flow diagram illustrating a method of the distributing server for distributing client packages to the client according to one embodiment of the present invention.

FIG. 4 illustrate a flow diagram of one embodiment of a method 400 for a distributing server (e.g., the distributing server 103 of FIGS. 1 and 2) to distribute client packages to the clients (e.g., the clients 101) of a subscribing server (e.g., the subscribing server 104). The method 400 may be performed by the processing logic 526 of FIG. 5 that may comprise hardware (e.g., circuitry, dedicated logic, programmable logic, microcode, etc.), software (such as instructions run on a processing device), or a combination thereof. In one embodiment, the method 400 is performed by the distributing server 103 of FIGS. 1 and 2.

Referring to FIG. 4, at block 410, the distributing server 103 encapsulates a client package within a client software repo package. The client software repo package contains at least a portion of a client repository. At block 420, the distributing server 103 receives a query from a subscribing server 104 for the client package. In response to the query, at block 430, the distributing server 103 indicates to the subscribing server 104 the availability of the client package. At block 440, the distributing server 103 transmits the client software repo package to the subscribing server 104. As the client software repo package may have a format that is compatible with the operating systems used by both of the distributing server 103 and the subscribing server 104, the transmission can be performed using the pre-established communication mechanism between the distributing server 103 and the subscribing server 104.

Figure 5:
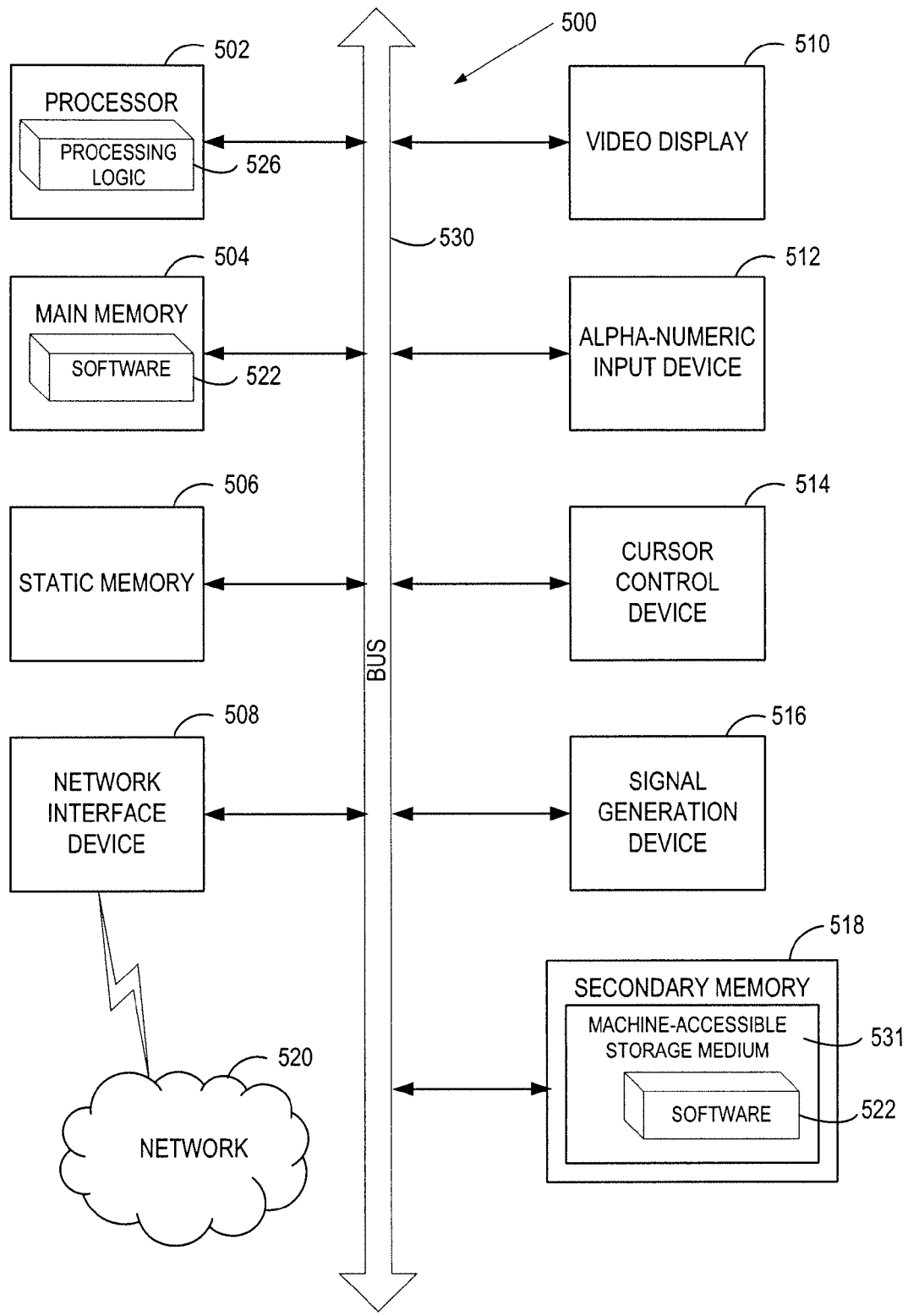
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the client repository 143 of FIG. 1 and FIG. 2. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    accessing, by a processor executing a subscribing manager on a subscribing server, a client software repository package with a client package in a subscribing server client repository;
    determining, by the processor, a query from the subscribing server for a new or updated client package in a distributing server client repository;
    sending, by the processor, the determined query to a distributing server;
    receiving, by the processor, an encapsulated client software repository package from the distributing server;
    storing the encapsulated client software repository package in the subscribing server client repository in a format compatible with the distributing server;
    installing, by the processor, the encapsulated client software repository package on the subscribing server;
    extracting, by the processor, from the encapsulated client software repository package, at least a client package and a client repository information encapsulated within the encapsulated client software repository package;
    storing the extracted client package and the extracted client repository information into the subscribing server client repository in a different format from the distributing server;
    receiving, by the processor, a second query from one or more clients for a new or updated client package in the subscribing server client repository;
    controlling access of one or more clients to the subscribing server client repository that are not authorized to access the distributing server in view of the second query; and
    transmitting the extracted client package to the at least one of the clients using the subscribing manager in view of the controlling.

2. The method of claim 1, further comprising:
    receiving an indication from the distributing server that a new update to the client package is available.

3. The method of claim 1, wherein controlling access of one or more clients comprises registering the one or more clients with the subscribing server and providing access to the subscribing server client repository under the control of the subscribing server.

4. The method of claim 1, wherein the subscribing server has direct control of the one or more clients.

5. The method of claim 1, wherein the encapsulated client software repository package is associated with a software product that is subscribed to by the subscribing server.

6. The method of claim 5, wherein the encapsulated client software repository package contains one or more additional client packages associated with one or more additional software products that are subscribed to by the subscribing server.

7. The method of claim 1, wherein the client software repository package enables installation and update of a software product on the one or more clients.

8. A system comprising:
a processing device;
a data storage device;
the data storage device comprising stored instructions, when executed by the processing device causes the processing device to perform operations:
executing a subscribing manager on a subscribing server;
accessing a client software repository package with a client package in a subscribing server client repository;
determining a query from the subscribing server for a new or updated client package in a distributing server client repository;
sending the determined query to a distributing server;
receiving an encapsulated client software repository package from the distributing server;
storing the encapsulated client software repository package in the subscribing server client repository in a format compatible with the distributing server;
installing the encapsulated client software repository package on the subscribing server;
extracting from the encapsulated client software repository package, at least a client package and a client repository information encapsulated within the encapsulated client software repository package;
storing the extracted client package and the extracted client repository information into the subscribing server client repository in a different format from the distributing server;
receiving a second query from one or more clients for a new or updated client package in the subscribing server client repository;
controlling access of one or more clients to the subscribing server client repository that are not authorized to access the distributing server in view of the second query; and
transmitting the extracted client package to the at least one of the clients using the subscribing manager in view of the control.

9. The system of claim 8, wherein the processing device is further to receive an indication from the distributing server that a new update to the client package is available.

10. The system of claim 8, wherein to control access of one or more clients comprises to register the one or more clients with the subscribing server and provide access to the subscribing server client repository under the control of the subscribing server.

11. The system of claim 8, wherein the subscribing server has direct control of the one or more clients.

12. The system of claim 8, wherein the encapsulated client software repository package is associated with a software product that is subscribed to by the subscribing server.

13. The system of claim 12, wherein the encapsulated client software repository package contains one or more additional client packages associated with one or more additional software products that are subscribed to by the subscribing server.

14. The system of claim 8, wherein the client software repository package enables installation and update of a software product on the one or more clients.

15. A non-transitory computer-readable storage medium comprising instructions when executed by a processing device, causes the processing device to perform operations:
accessing by executing a subscribing manager on a subscribing server, a client software repository package with a client package in a subscribing server client repository;
determining by the processing device, a query from the subscribing server for a new or updated client package in a distributing server client repository;
sending the determined query to a distributing server;
receiving an encapsulated client software repository package from the distributing server;
storing the encapsulated client software repository package in the subscribing server client repository in a format compatible with the distributing server;
installing the encapsulated client software repository package on the subscribing server;
extracting from the encapsulated client software repository package, at least a client package and a client repository information encapsulated within the encapsulated client software repository package;
storing the extracted client package and the extracted client repository information into the subscribing server client repository in a different format from the distributing server;
receiving a second query from one or more clients for a new or updated client package in the subscribing server client repository;
controlling access of one or more clients to the subscribing server client repository that are not authorized to access the distributing server in view of the second query; and
transmitting the extracted client package to the at least one of the clients using the subscribing manager in view of the control.

16. The non-transitory computer-readable storage medium of claim 15, wherein the processing device is further to:
receiving an indication from the distributing server that a new update to the client package is available.

17. The non-transitory computer-readable storage medium of claim 15, wherein to control access of one or more clients comprises to register the one or more clients with the subscribing server and provide access to the subscribing server client repository under the control of the subscribing server.

18. The non-transitory computer-readable storage medium of claim 15, the subscribing server has direct control of the one or more clients.

19. The non-transitory computer-readable storage medium of claim 15, wherein the encapsulated client software repository package is associated with a software product that is subscribed to by the subscribing server.

20. The non-transitory computer-readable storage medium of claim 19, wherein the encapsulated client software repository package contains one or more additional client packages associated with one or more additional software products that are subscribed to by the subscribing server.

21. The non-transitory computer-readable storage medium of claim 15, wherein the client software repository package enables installation and update of a software product on the one or more clients.

* * * * *